United States Patent
Yoshida et al.

(10) Patent No.: US 6,515,944 B1
(45) Date of Patent: Feb. 4, 2003

(54) DISK PLAYBACK DEVICE AND METHOD OF CONTINUOUSLY PLAYING BACK DISKS WITHOUT A BREAK IN SOUND REPRODUCTION

(75) Inventors: Masanao Yoshida, Osaka (JP);
Yoshimasa Ono, Higashiosaka (JP);
Katsuyuki Matsumoto, Osaka (JP);
Hitoshi Miyamoto, Yao (JP)

(73) Assignees: Sanyo Electric Co., Ltd., Osaka (JP);
Sanyo Tecnosound Co., Ltd., Osaka (JP)

( * ) Notice: Subject to any disclaimer, the term of this patent is extended or adjusted under 35 U.S.C. 154(b) by 0 days.

(21) Appl. No.: 09/259,684

(22) Filed: Mar. 1, 1999

(30) Foreign Application Priority Data

Mar. 2, 1998 (JP) .......................................... 10-049590

(51) Int. Cl.[7] .............................................. G11B 17/22
(52) U.S. Cl. .................................. 369/30.23; 369/30.28
(58) Field of Search ............................... 369/47.11, 47.3, 369/53.29, 53.37, 33, 30.23, 30.28

(56) References Cited

U.S. PATENT DOCUMENTS 4,706,233 A * 11/1987 D'Alayer De Costemore D'Arc ........ 369/33
5,359,583 A * 10/1994 Jung ............................ 369/54
5,365,503 A * 11/1994 Goto ...................... 369/47.3 X
5,745,462 A * 4/1998 Aramaki ...................... 369/58

FOREIGN PATENT DOCUMENTS

| EP | 0 352 131 A2 | 1/1990 |
|---|---|---|
| JP | 62-150560 | 7/1987 |
| JP | 5-85980 | 12/1993 |
| JP | 9-69263 | 3/1997 |

* cited by examiner

Primary Examiner—Aristotelis M. Psitos
(74) Attorney, Agent, or Firm—Armstrong, Westerman & Hattori, LLP

(57) ABSTRACT

A disk playback device including a memory for temporarily storing data from a pickup and outputting the data as delayed by a predetermined period of time, manual keys, and a system control circuit for detecting the playback end of a disk from the playback data from the pickup. The memory has connected thereto an erase circuit for erasing data remaining in the memory. The system control circuit produces different flag values in a first case wherein the control circuit detects the disk end to terminate playback of the disk and in a second case wherein the user manipulates one of the manual keys to terminate the playback. A memory control circuit is connected to the memory and the system control circuit. In the first case, the memory control circuit inputs to the memory playback data of another disk replacing the disk as continued from the data remaining in the memory. In the second case, the circuit inputs to the memory the playback data of another disk replacing the preceding disk after the data remaining in the memory is erased by the erase circuit.

3 Claims, 9 Drawing Sheets

DISK PLAYBACK DEVICE AND METHOD OF CONTINUOUSLY PLAYING BACK DISKS WITHOUT A BREAK IN SOUND REPRODUCTION

BACKGROUND OF THE INVENTION

The present invention relates to disk playback devices, such as compact disk players.

1. Field of the Invention

The disks to be described below are those having music information recorded thereon, whereas such disks may be those having English conversation or other programs recorded thereon.

2. Description of the Related Art

With common disk playback devices, a break occurs in the sound reproduced from disks during a change from one disk played back to another disk. This gives discomfort to the user who is desirous of listening to the reproduced sound without any interruption. In view of such experience, playback devices have been proposed which permit a change of disk without a break in the reproduced sound (see JP-A No. 69263/1997).

The proposed device is of the so-called autochanger type, which has a stacker 8 for accommodating a plurality of disks D as arranged one above another as shown in FIG. 8. The disk D is delivered from the stacker 8 by a change hand 81 of a disk changer mechanism 80. The disk D is placed on a turntable 73, and a reproduction signal is retrieved from the disk by a pickup 2 which is slidable radially of the disk. With an error signal taken out by an RF amplifier circuit 20, the reproduction signal is stored in a memory 5 by a system controller 82. Since the signal is written to the memory 5 at a rate which is always higher than the reading rate, a predetermined quantity of data is stored in the memory 5 at all times.

For a change of disk, the system controller 82 operates the disk changer mechanism 80, which places the disk on the turntable 73 into the stacker 8 and automatically takes out another disk from the stacker 8. During the changing procedure, the data remaining in the memory 5 is reproduced with no break occurring. in the reproduced sound.

Portable disk playback devices have been proposed in recent years. With reference to FIG. 9 showing such a device, a base frame 70 for placing a disk thereon has a closure 7 pivoted to one side portion thereof and positionable over the disk. The disk on the playback device needs to be replaced by another one by the user himself. However, the user, while listening to the reproduced sound, is unable to recognize when to change the disk because he has no means to detect when the playback of the disk is about to terminate.

Such a portable disk playback device has also been proposed which is adapted to temporarily store the sound reproduced from the disk in a memory 5 and output the sound a predetermined period of time thereafter (see JP-B No. 85980/1993). The device has a vibration proof function and is adapted to correct skipping of sound. As shown in FIG. 6, the device has memory means 55 for storing the sound reproduced from the disk in the order of addresses, and sensor means 56 for detecting discontinuity of time code of the reproduced sound, i.e., inaccurate reproduction. Upon the sensor means 56 detecting a discontinuity in the time code, the pickup 2 is moved back to a position on the disk before the occurrence of the discontinuity, with writing to the memory means 55 suspended during the movement of the pickup 2. The writing to the memory means 55 is resumed after the pickup 2 has been moved. The portion of skip is not stored in the memory means 55, permitting a speaker 91 to output the reproduced sound without any break.

SUMMARY OF THE INVENTION

The present invention has been conceived based on the idea that even portable disk playback devices can be adapted for a disk change without an interruption of sound reproduction or with a shortened duration of interruption when the device is provided with means for notifying the user of disk change timing, utilizing memory means for temporarily storing the sound reproduced from the disk.

When the user changes from one disk to another, the user is desirous of suspending playback of the current disk and quickly playing back the next disk replacing the first disk, or the user is desirous of playing back the next disk after the current disk has been completely played back to the last. In the former case, however, the playback data of the first disk is continuously output from the memory 5 although disk playback is suspended during continuous playing-back operation. This gives discomfort to the user who is desirous of promptly playing back the next disk. Alternatively in the latter case, it is desirable to output the playback data of the next disk after the playback data of the first disk has been completely output.

OBJECT AND ADVANTAGE OF THE INVENTION

An object of the present invention is to make different the timing at which the playback data of a disk replacing the preceding disk is output, when playback of the preceding disk is suspended and when the preceding disk is played back completely to the last, as desired by the user intending to change the disk.

The disk playback device of the invention comprises a memory 5 and erase means connected to the memory 5 for erasing data remaining in the memory 5.

Provided inside the device are flag generating means for producing different flag values in a first case wherein end sensor means detects the playback end of a disk to terminate playback of the disk and in a second case wherein the user manipulates one of manual keys 31 to terminate the playback, discriminating means for judging whether termination of disk playback is the, first case or the second case from the flag value, and memory control means connected to the discriminating means and operable in the first case to input to the memory 5 playback data of another disk replacing the above disk as continued from the data remaining in the memory 5, the memory control means being operable in the second case to input to the memory 5 the playback data of another disk replacing the first-mentioned disk after the data remaining in the memory 5 is erased by the erase means.

In the first case, the user is desirous of playing back the disk completely to the last. The data of the second disk replacing the preceding disk is output from the memory 5 subsequent to the output of the data of the preceding disk from the memory 5. The disk sound reproduction involves no interruption even during the change of disk, or the duration of interruption is shortened.

On the other hand, in the second case wherein the user intentionally discontinues disk playback, the user is desirous of playing back the next disk instead of the disk currently being played back. In this case, the data remaining in the memory 5 is first erased, so that the playback data of the disk replacing the current disk is output without waiting for complete output of data of the preceding disk. In the second case, therefore, the playback data of the subsequent disk is output promptly.

Thus, the timing at which the playback data of the disk subsequent to a disk change can be altered as desired by the user.

DETAILED DESCRIPTION OF THE PREFERRED EMBODIMENTS

[Overall Construction]

Figure 9:
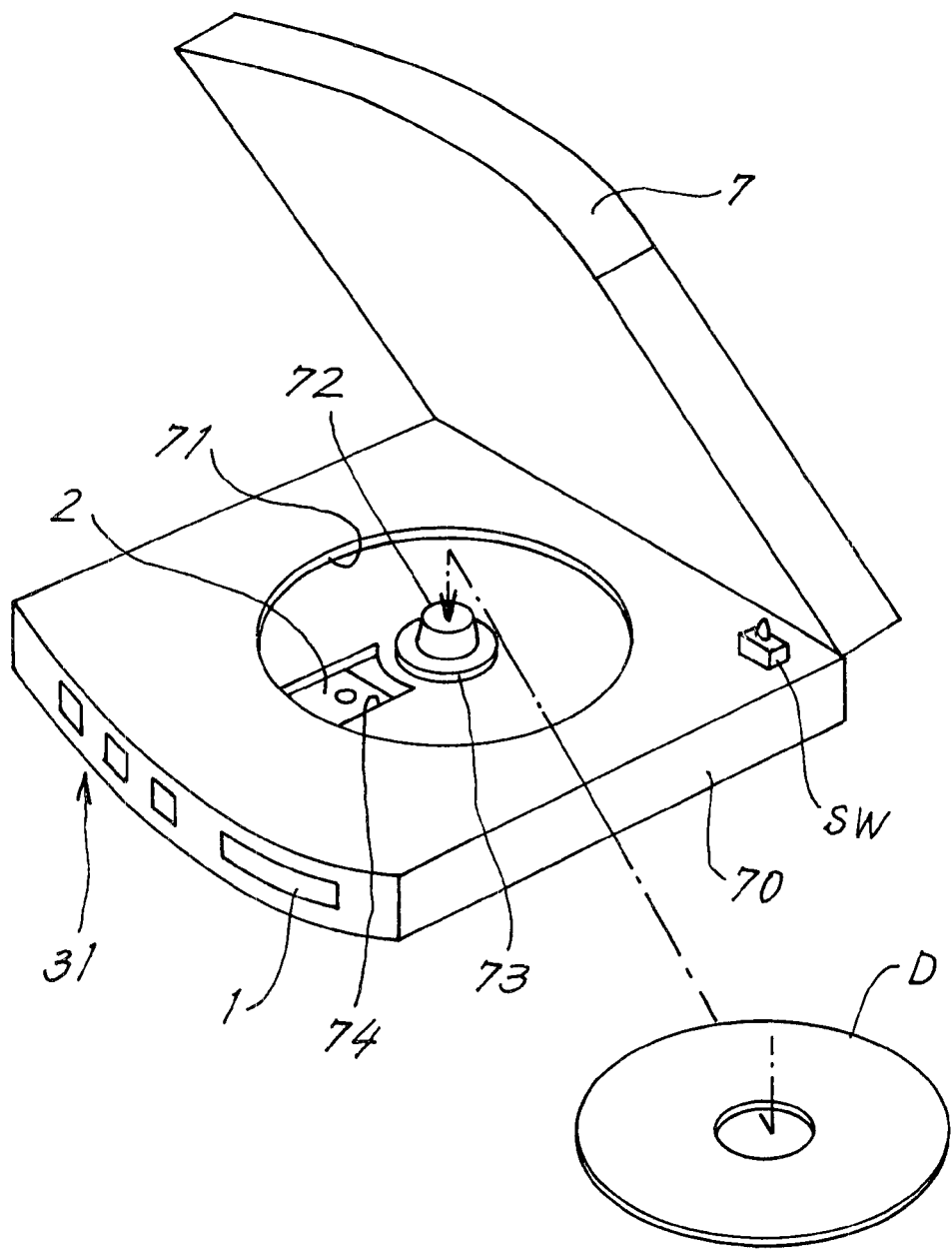
FIG. 9 is a perspective view of a portable disk playback device.

FIG. 9 is a perspective view of a disk playback device of the type described. The device, which is for portable use, comprises a base frame 70 formed with a recessed portion 71 for placing a disk therein. A closure 7 is pivoted at its base end to one side portion of the frame 70. Projecting from the central part of the recessed portion 71 are a turntable 73 for placing a disk thereon, and a clamp member 72 fittable in the center hole of the disk. A pickup 2 is slidably rovided below a window 74 formed in the recessed portion 71. The disk is played back with the closure 7 closed. Mounted on the base frame 70 is a switch SW which is positioned toward the pivoted portion of the closure 7 and which is turned on when the closure 7 is closed. When the disk is to be replaced by another one, the closure 7 is opened, whereby the switch SW is turned off. The front side of the base frame 70 is provided with a display portion 1 for indicating the total number of pieces of music recorded on the disk, total playback time, number of piece of music currently being played back and elapsed playback time. The display portion 1 comprises a liquid-crystal display device and has a backlight to ensure ease of viewing. The front side of the frame 70 is also provided with a group of manual keys 31 for use by the user for entering operating data. The key group 31 includes a STOP key (not shown) for use in discontinuing playback or other operation.

Figure 1:
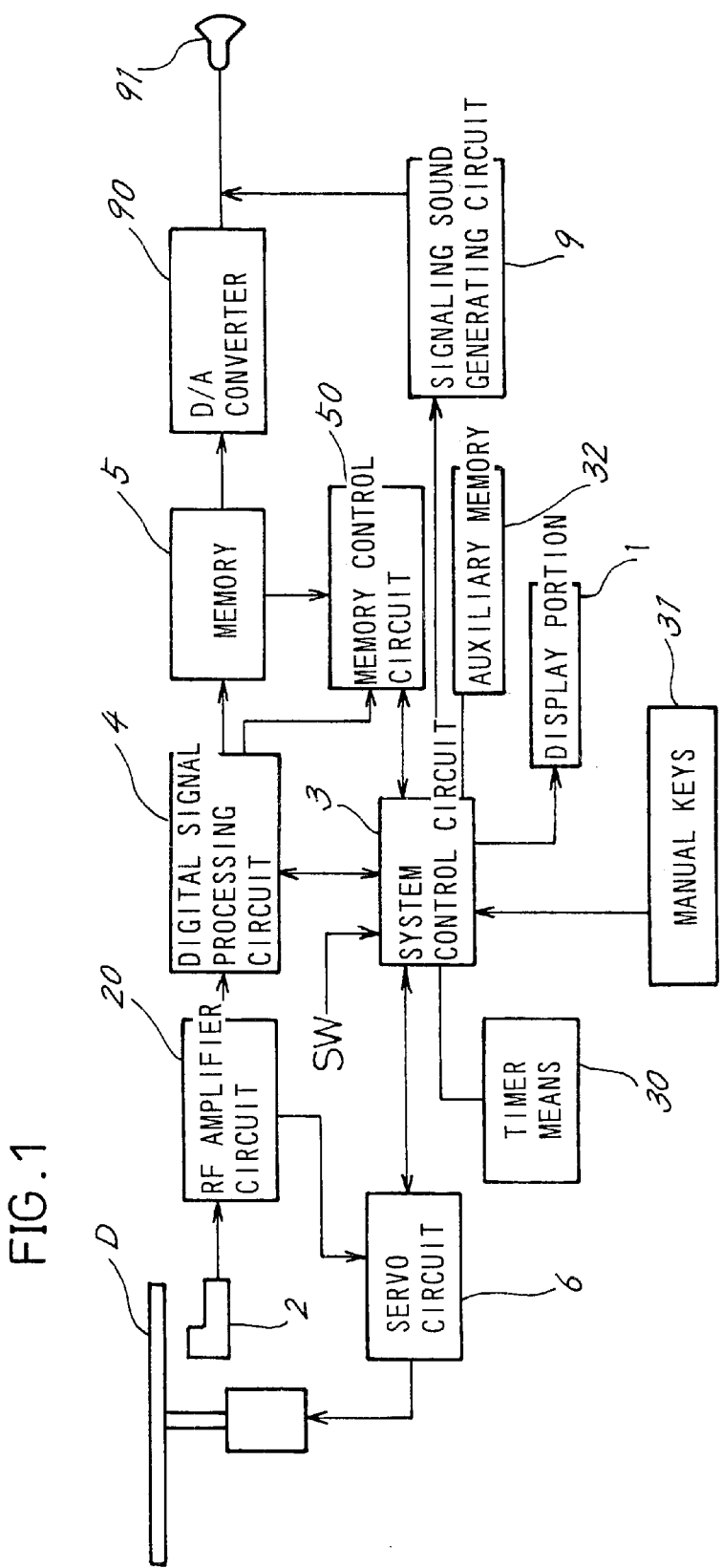
FIG. 1 is a block diagram of a disk playback device embodying the invention.

FIG. 1 is a block diagram showing the construction of the disk playback device. The data read from the disk D by the pickup 2 is converted to a digital signal by an RF amplifier circuit 20, which also produces a tracking error signal. The digital signal is delivered from the RF amplifier circuit 20 to a digital signal processing circuit 4, in which the signal is processed, for example, for correction of errors according to CIRC (Cross Interleaved Reed-Solomon Code). The dataprocessed by the circuit 4 is temporarily stored in a memory 5 under the control of a memory control circuit The memory 5 is an FIFO memory having a capacity of 16 Mbits. Assuming that the sampling bits are 4 in number, data for about 40 seconds can be stored in the memory 5. The data is delivered from the memory 5 to a D/A converter 90 and thereby converted again to an analog signal, which is delivered from a speaker 91.

The tracking error signal is output from the RF amplifier circuit 20 and fed to a servo circuit 6, which controls the movement of the pickup 2 according to the tracking error signal.

The digital signal processing circuit 4 and the servo circuit 6 are connected to a system control circuit 3, which, in turn, controls these circuits 4, 6, and changes the mode of a disk playback mechanism in response to an input from the group of manual keys 31. Also connected to the system control circuit 3 are timer means 30 and an auxiliary memory 32 for temporarily storing a check flag which is to be set by the system control circuit 3 as will be described below.

Figure 2:
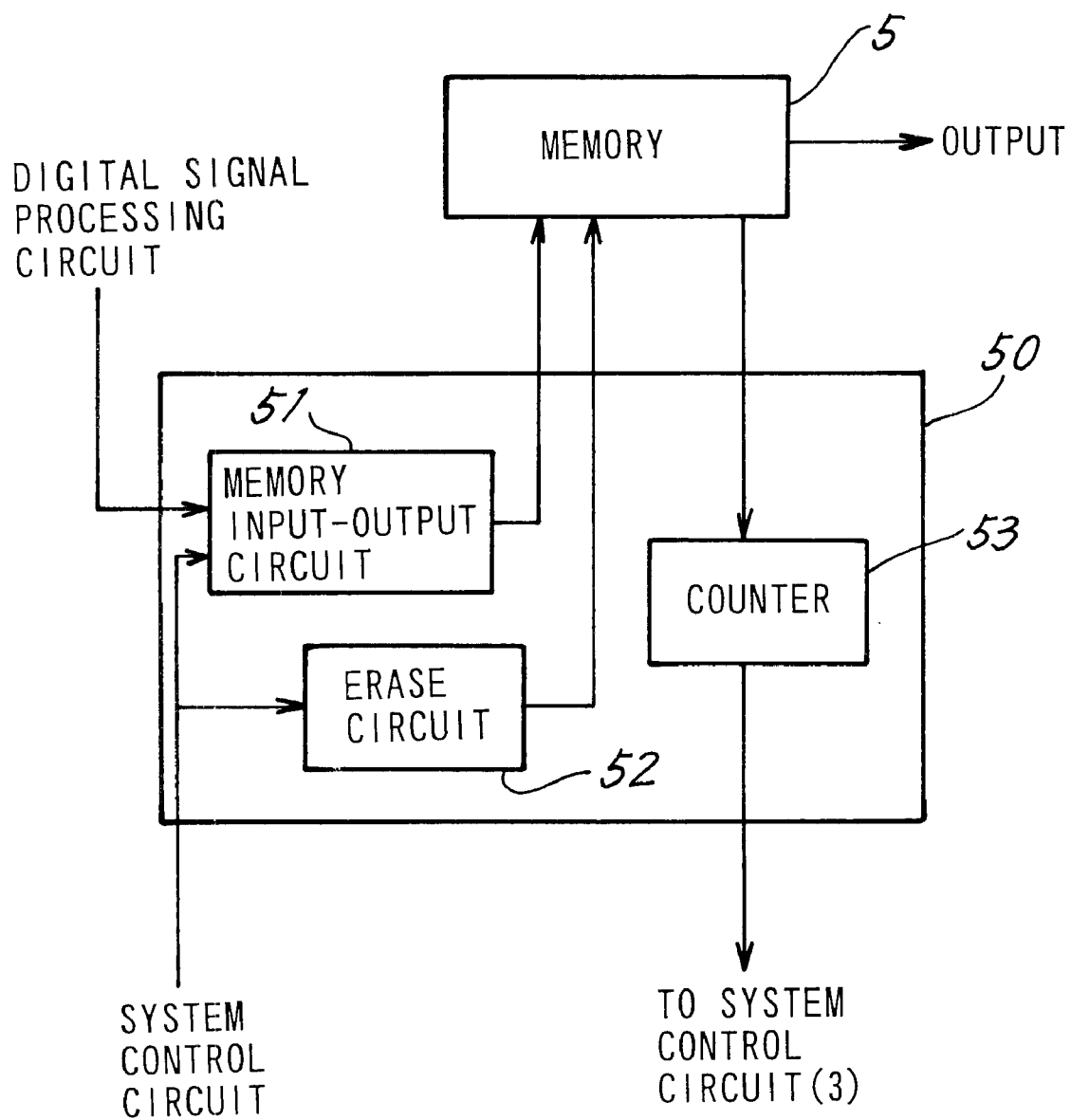
FIG. 2 is a block diagram of the interior of a memory control circuit.

The system control circuit 3 is connected to a signaling sound generating circuit 9, the memory control circuit 50 and the display portion 1. The circuit 9 produces a signaling sound immediately before the termination of playback of the disk. FIG. 2 is a block diagram showing the interior of the memory control circuit 50. Provided in the memory control circuit 50 are a memory input-output circuit 51 for storing the data from the digital signal processing circuit 4 in the memory 5 in the order of addresses and outputting the data from the memory in the order of addresses, a counter 53 for calculating the quantity of data remaining in the memory 5, and an erase circuit 52 for erasing the data in the memory 5. The memory input output circuit 51 and the erase circuit 52 are controlled by the system control circuit 3. The memory 5 is controlled by the input-output circuit 51 so that the writing rate is higher than the reading rate.

Figure 3:
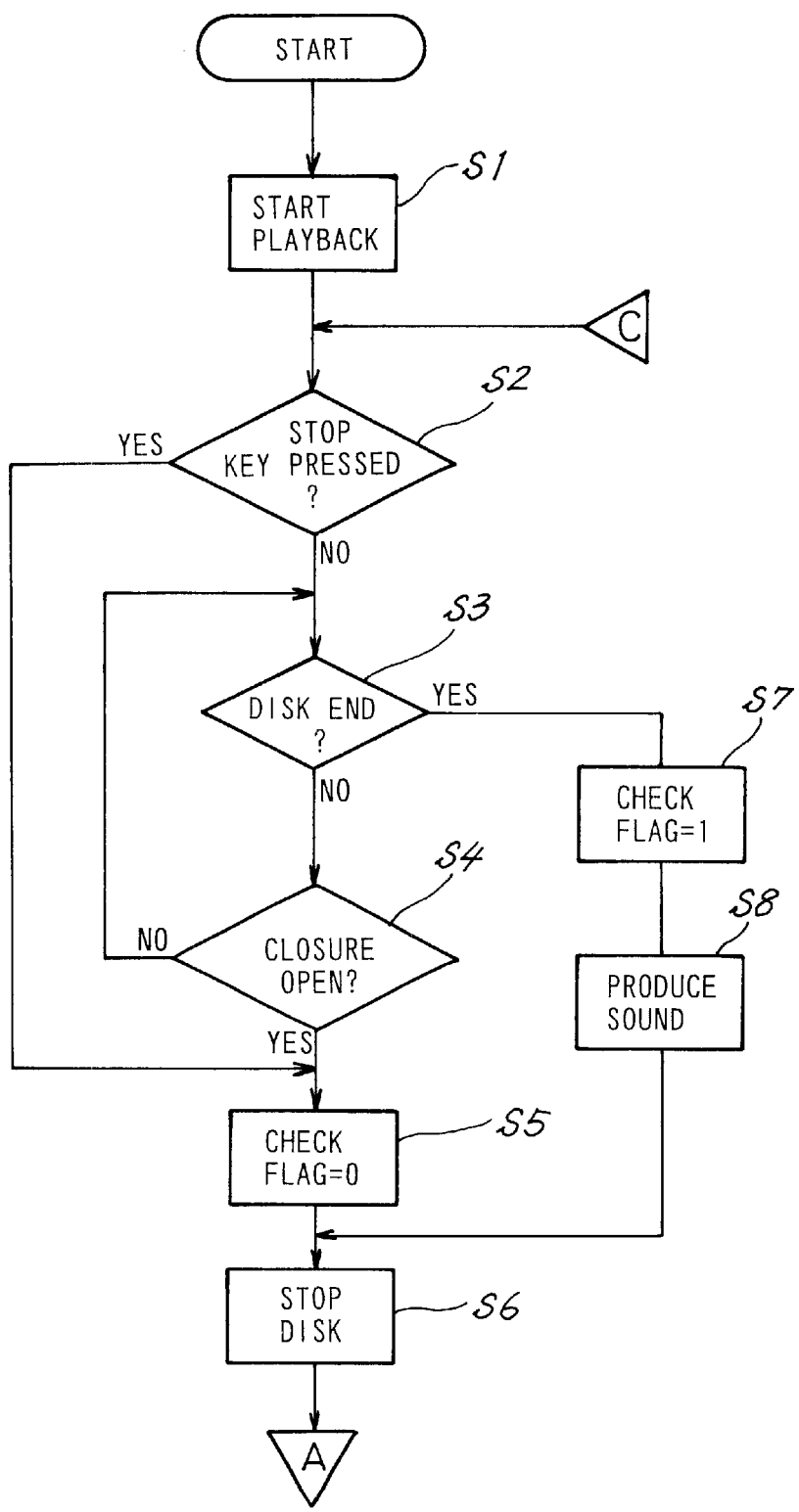
FIGS. 3 to 5 are flow charts showing a continuous disk playback procedure.
Figure 4:
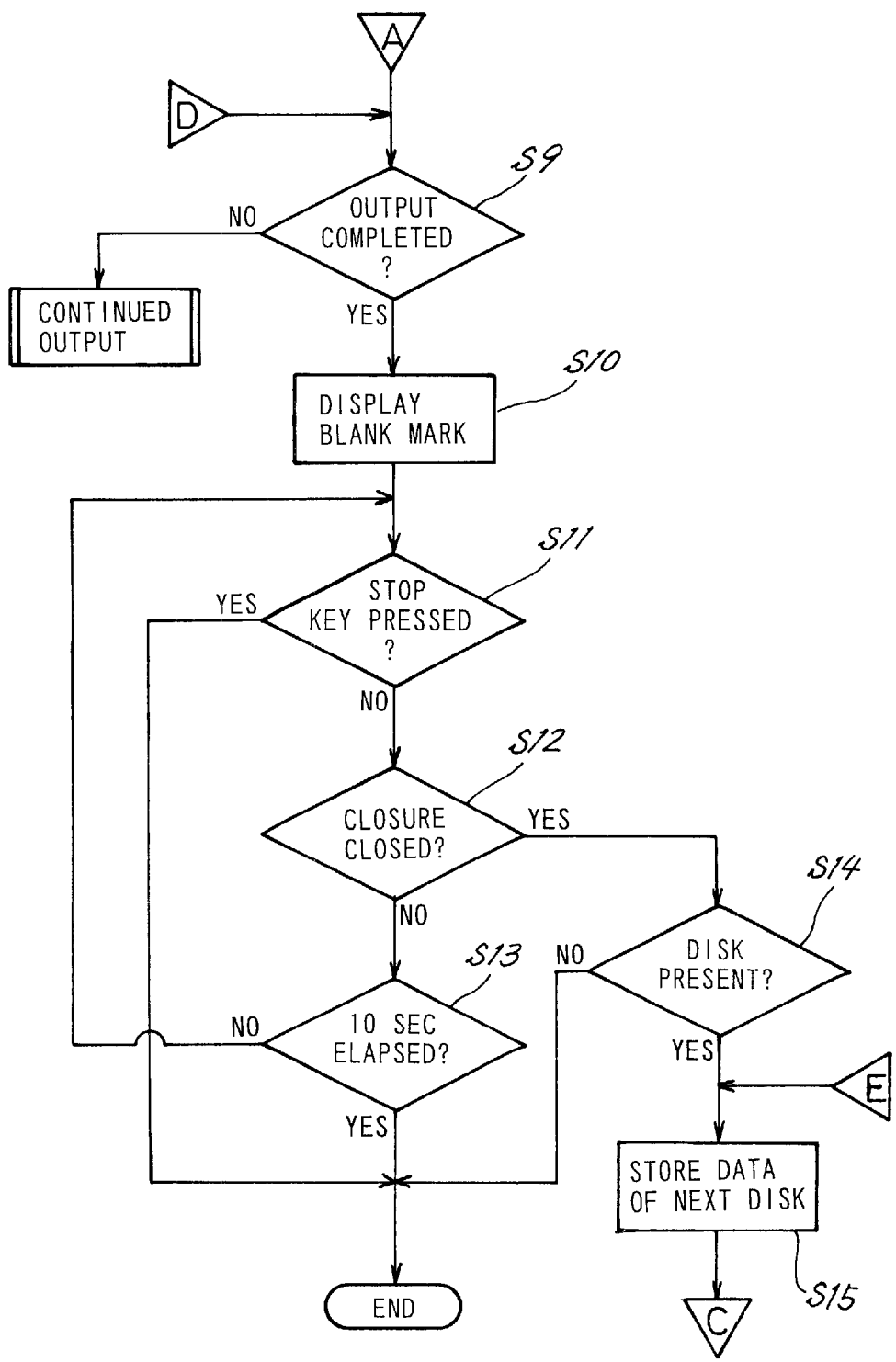

With the device of the present invention, the data obtained from the disk by playback, i.e., playback data, is temporarily stored in the memory 5 and then output therefrom. During the change of one disk completely played back to another disk, the memory 5 outputs the data of the disk preceding the change. After the change, the playback data of the second disk is written to the memory 5. Since the memory 5 is so controlled that the writing rate is higher than the reading rate, there is no interruption of sound reproduction or the duration of interruption is shortened. The timing at which the playback data of the second disk subsequent to the change is output differs when the user intentionally discontinued the playback of the first disk and when the pickup 2 automatically terminated playback upon reaching the playback end of the first disk. The operation procedure will be described below with reference to the flow charts of FIGS. 3 to 5.

First, the user manipulates the device to play back a disk D (S1). The pickup 2 moves from an inner peripheral portion of the disk toward the outer periphery thereof. The signal reproduced from the disk is stored in the memory 5, and when a specified quantity of signal data has been stored, the stored data is converted by the D/A converter 90 to an analog signal, which is delivered from the speaker 91. The present device has a vibration proof function for precluding the interruption of sound reproduction due to external vibrations. This function has already been described and will not be described again.

Figure 7:
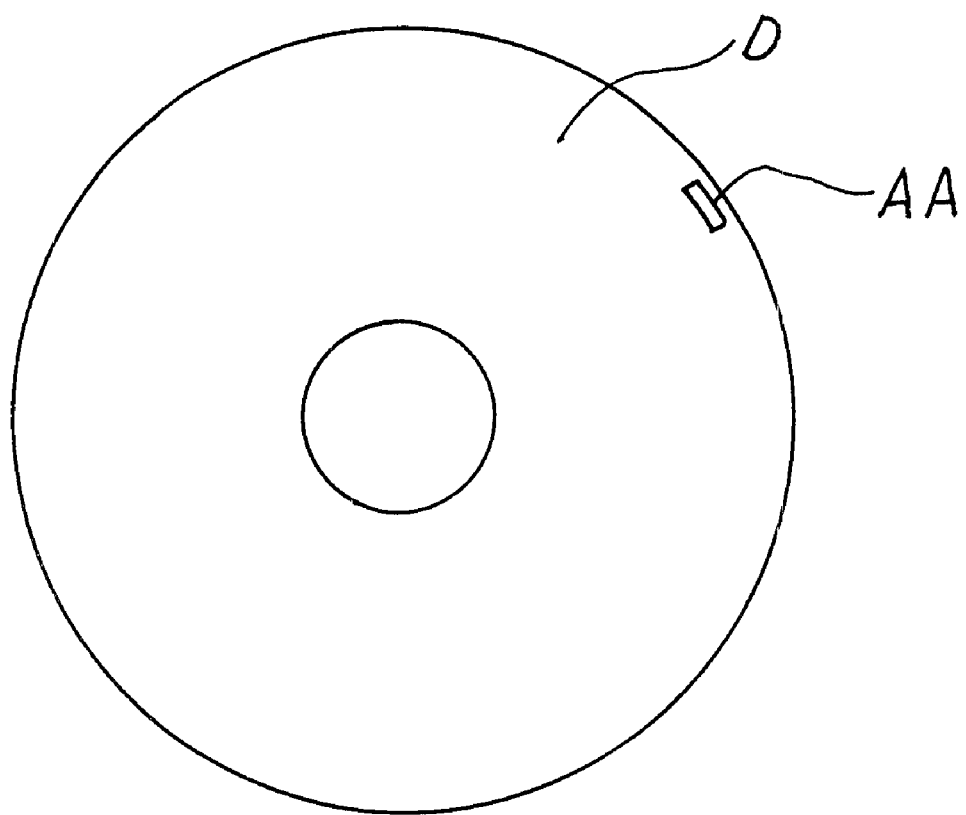
FIG. 7 is a plan view showing subcode data AA on a disk.
Figure 8:
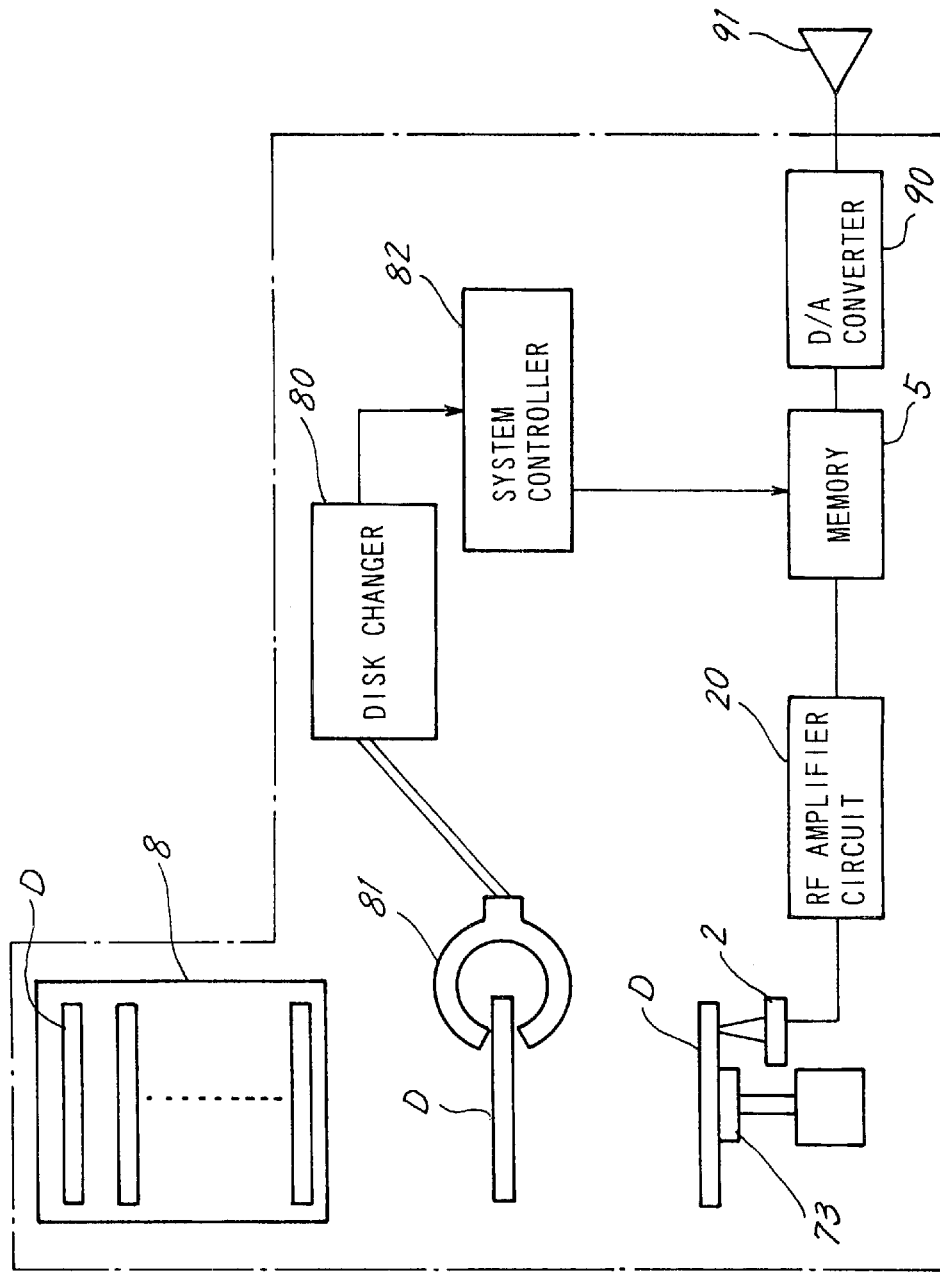
FIG. 8 is a block diagram of another conventional disk playback device.

The system control circuit 3 checks whether a signal is input by pressing the STOP key, indicating that the playback is to be discontinued (S2), and further checks whether the pickup 2 has reached the playback end of the disk and completely played back the disk (S3). As shown in FIG. 7, the disk has recorded at its end subcode data which is termed AA. This data AA is detected by the pickup 2 for the detection of the disk end. Thus, steps S2 and S3 check whether the playback is discontinued as desired by the user or automatically terminated upon the pickup 2 reaching the disk end.

If the closure 7 inadvertently opens during the playback of the disk and turns off the switch SW, the system control circuit 3 forcibly discontinues the playback to preclude damage to the disk. Accordingly when the disk playback is terminated upon detection of the disk end, the closure 7 remains closed during playback.

When the disk has not been played back completely to the last, an inquiry is made as to whether the closure 7 is open with reference to on-off data as to the switch SW (S4). If the closure 7 is open, this can be interpreted as indicating that the disk has been changed or is being changed. The system control circuit 3 sets the check flag at a value of 0 and stores the flag in the auxiliary memory 5 (S5). On the other hand, if the pickup 2 is found to have reached the disk end in step S3, the circuit 3 stores the check flag with a value of 1 in the auxiliary memory 5 (S7). Further a signaling sound is produced to inform the user that the playback is about to terminate (S8).

Figure 5:
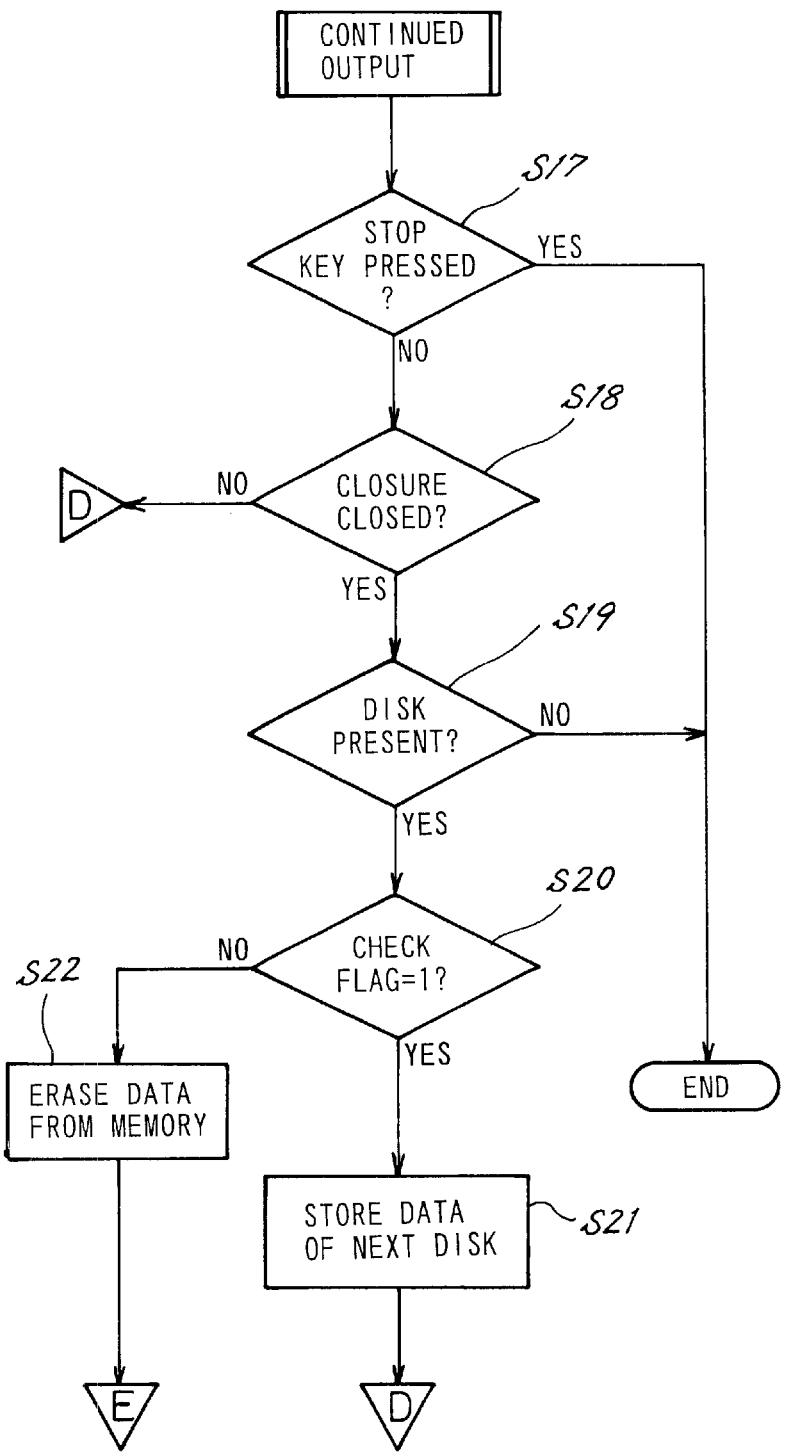
Figure 6:
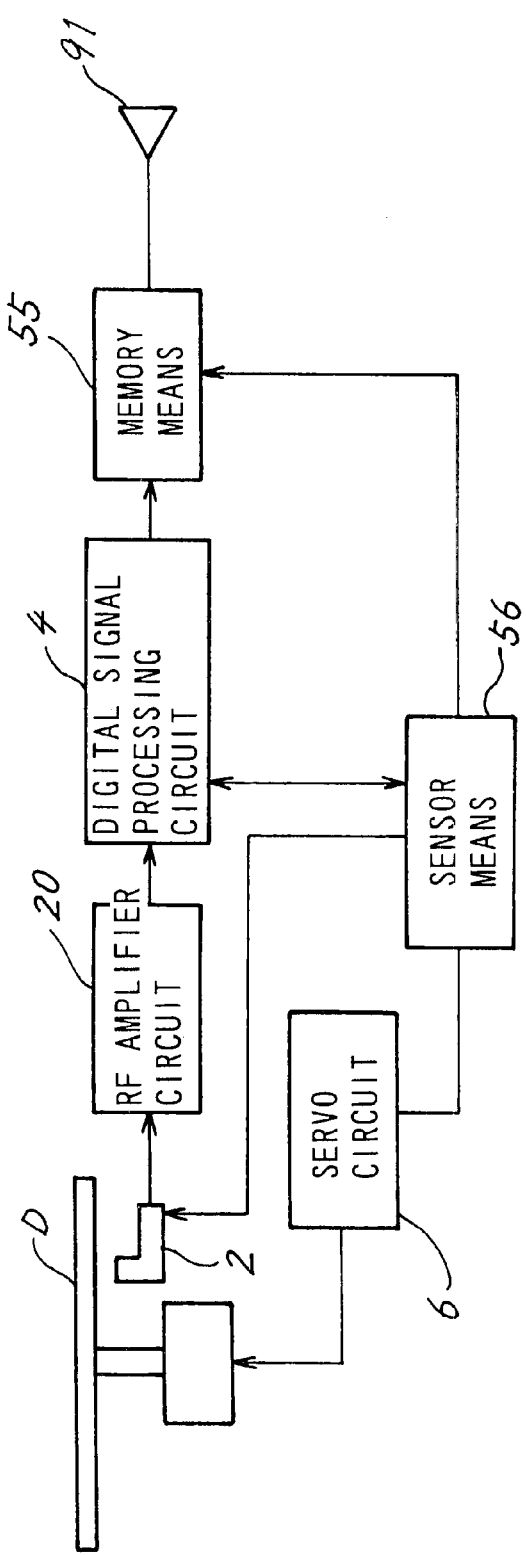
FIG. 6 is a block diagram of a conventional disk playback device having a vibration proof function.

After the disk in rotation is brought to a halt (S6), the system control circuit 3 checks whether the signal in the memory 5 has been completely output with reference to the counter 53 (S9). If the signal is still being output, an inquiry is made as to whether the STOP key was pressed during steps S6 through S9 as shown in FIG. 5 (S17). When the answer to the inquiry is affirmative, this indicates that the user is not desirous of a further playback operation, so that the device is entirely brought out of operation. In other words, the STOP key is pressed not only when the rotating disk is to be halted but also when discontinuing the delivery of data from the memory 5. The signal from the pressed STOP key may be temporarily stored in the auxiliary memory 32 during steps S6 through S9.

When the STOP key is not found pressed in step S17, an inquiry is made as to whether the closure 7 is closed (Sl8). If the closure 7 is open, there is a likelihood of a disk change, so that the sequence returns to step S9. Steps S17 and S18 are repeated until the signal output from the memory 5 is completed.

If the closure 7 is found closed in step S18, an inquiry is made as to whether the disk is present in the recessed portion 71 (Sl9, see FIG. 9). The pickup 2 projects onto the disk a beam, which indicates presence of the disk when detected upon reflection. If no reflected beam is detected, this indicates absence of the disk.

When no disk is found in the recessed portion 71, it is very likely that the closure 7 is closed after the disk has been removed, so that the entire operation is completed. In the presence of the disk, the system control circuit 3 recognizes the value of the check flag with reference to the auxiliary memory 5 (S20).

More specifically, the value of the check flag is 0 if the disk is changed before the pickup 2 reaches the end of the disk, whereas the value is 1 if the pickup 2 is at the disk end.

When the value of the check flag is 0, the system control circuit 3 operates the erase circuit 52 to erase the data remaining in the memory 5 (S22). Next, another disk set in position upon a change is played back, and the memory input-output circuit 51 is operated to start to store data in the memory 5 (S15). When storage of a specified quantity of data in the memory 5 is detected with reference to the counter 53, data output is started immediately. In the case where the user intentionally discontinues playback, followed by a disk change, the playback data of the disk set by the change is output without waiting for the complete output of reproduction signal of the preceding disk.

When the check flag value is found to be 1 in step S20, the system control circuit 3 starts to store in the memory 5 the playback data of the disk set by the change (S21) while continuously outputting the data of the preceding disk remaining in the memory 5. Thus, the playback data of the second disk is output from the memory 5 after the remaining data of the preceding disk has been completely output from the memory 5.

On the other hand, if the data is found to have been completely output from the memory 5 in step S9, the system control circuit 3 shows "_" (blank mark) on the display portion 1 (S10), urging the user to take the next action. If the STOP key is pressed during steps S6 through S9, all the operation is completed.

However, unless the STOP key is pressed (S11), an inquiry is then made as to whether the closure 7 is closed (S12). If the closure 7 is open, it is likely that the disk is being changed, so that the system control circuit 3 activates the timer means 30, counting a period of 10 seconds (S13) after detecting the closure 7 as opened in step S12. If the closure 7 is not closed during the period of 10 seconds, this is interpreted as indicating no disk change, and all operation is completed.

When the closure 7 is closed during the 10-second period, the recessed portion 71 is checked for the presence of disk (S14). If no disk is found, all operation is terminated. In the presence of disk within the recessed portion 71, the disk is played back, and the data is stored in the memory 5 (S15). When a specified quantity of data is stored in the memory 5, the data is output from item to item in the order of input.

When the disk is to be changed after the pickup 2 has reached the disk end, this is the case wherein the user is desirous of playing back the disk completely to the last, so that the complete output of data of the disk before changing is followed by the output of playback data of the subsequent disk set by a change.

On the other hand, when the user intentionally discontinues disk playback, the user is desirous of playing back another disk instead of the disk currently being played back. With the present device, the user presses the STOP key to discontinue disk playback, and thereafter changes the current disk to another disk, whereby the data remaining in the memory 5 is erased. Accordingly, the playback data of the second disk is output without waiting for the completion of data output of the preceding disk. Thus, the timing at which the playback data of the disk subsequent to a change is output can be made different as desired by the user.

What is claimed is:

1. A disk playback device having data read means for reading playback data from a disk being played back, a memory for temporarily storing the playback data from the data read means and outputting the playback data as delayed by a predetermined period of time, manual keys for inputting signals when manipulated by a user, and end sensor means for detecting a playback end of the disk from the playback data from the data read means, the disk playback device comprising:

erase means connected to the memory for erasing playback data remaining in the memory, flag generating means for producing different flag values in a first case wherein the end sensor means detects the disk end to terminate playback of the disk and in a second case wherein the user manipulates one of the manual keys to terminate the playback, discriminating means for judging whether termination of disk playback is the first case or the second case from the flag value, and memory control means connected to the discriminating means and operable in the first case to input to the memory playback data of another disk replacing said disk as continued from the playback data remaining in the memory, the memory control means being operable in the second case to input to the memory the playback data of said another disk after the playback data remaining in the memory is erased by the erase means.

2. A disk playback device according to claim 1, wherein the end sensor mean has connected thereto signaling sound generating means for producing a second when informed that the end sensor means has detected the disk end.

3. A continuous disk playing-back method using a disk playback device having playback data read means for reading playback data from a disk being played back, a memory for temporarily storing the playback data from the data read means and outputting the playback data as delayed by a predetermined period of time, manual keys for inputting signals when manipulated by a user, and end sensor means for detecting a playback end of the disk from the playback data from the data read means, the memory having connected thereto erase means for erasing playback data remaining in the memory, the method comprising:

producing different flag values in a first case wherein the end sensor means detects the disk end to terminate playback of the disk and in a second case wherein the user manipulates one of the manual keys to terminate the playback, judging whether termination of disk playback is the first case or the second case from the flag value, inputting to the memory playback data of another disk replacing said disk as continued from the playback data remaining in the memory in the first case, or inputting to the memory the playback data of said another disk after the playback data remaining in the memory is erased by the erase means in the second case, and outputting the playback data of said another disk from the memory.

* * * * *